United States Patent [19]

Siegel et al.

[11] 4,133,946
[45] Jan. 9, 1979

[54] OPTICALLY ACTIVE POLYMERIC METHYLPINANE DERIVATIVES CONTAINING UREIDO GROUPS

[75] Inventors: Hardo Siegel, Speyer; Herbert Naarmann, Wattenheim, both of Fed. Rep. of Germany

[73] Assignee: BASF Aktiengesellschaft, Ludwigshafen, Fed. Rep. of Germany

[21] Appl. No.: 888,402

[22] Filed: Mar. 20, 1978

[30] Foreign Application Priority Data

Apr. 20, 1977 [DE] Fed. Rep. of Germany ....... 2717500

[51] Int. Cl.² ............................................ C08F 32/08

[52] U.S. Cl. ............................... 526/282; 260/29.2 N; 260/32.6 N; 260/33.6 UA; 260/553 R; 260/878 R; 526/6

[58] Field of Search ......................................... 526/282

[56] References Cited

U.S. PATENT DOCUMENTS 3,282,844  11/1966  Borchert et al. ..................... 526/282

Primary Examiner—Stanford M. Levin
Attorney, Agent, or Firm—Keil, Thompson & Shurtleff

[57] ABSTRACT

New polymers which contain 1,6,6-trimethylnorpinanyl-2-methyl or 3-pinanylmethyl groups, i.e. macromolecular compounds in which the side chains contain optically active groups, so that the polymers may also be optically active. The new polymers may be used for the production of moldings, coatings and adhesives and as optical modifiers for films.

1 Claim, No Drawings

OPTICALLY ACTIVE POLYMERIC METHYLPINANE DERIVATIVES CONTAINING UREIDO GROUPS

The present invention relates to new polymers and to a process for their manufacture.

It is an object of the present invention to provide polymers which contain optically active groups and which are stable to hydrolysis.

We have found that this object is achieved by providing polymers with K values of from 20 to 140, which polymers contain structural units of the general formula

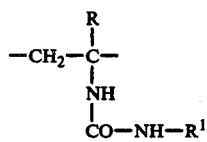

where R is H or $CH_3$ and $R^1$ is

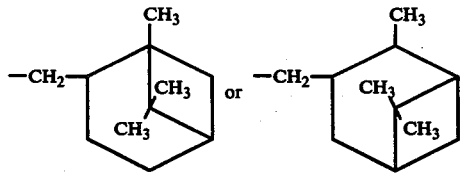

These polymers are macromolecular compounds in which the side chains contain optically active 1,6,6-trimethylnorpinanyl-2-methyl or 3-pinanylmethyl groups, and which accordingly may also be optically active.

It is a further object of the present invention to provide a method of manufacturing such polymers.

We have found that this object is achieved by polymerizing unsaturated compounds of the general formula

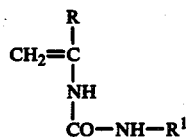

where R is H or methyl and $R^1$ is

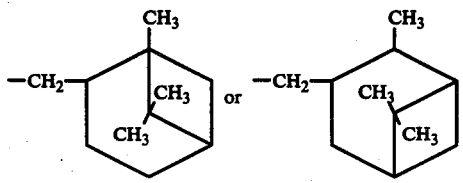

with or without other olefinically unsaturated compounds.

Polymers with K values of from 20 to 140, which contain structural units of the general formula

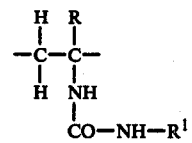

where R and $R^1$ have the above meanings, are macromolecular compounds which consist entirely or substantially or partially of recurring units of the formula

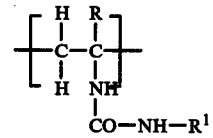

where the portion

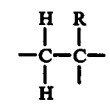

of the formula is part of the polymer chain. Accordingly, the general formula embraces both homopolymers, i.e. polymers which contain only the above structural units, and copolymers with compounds which are copolymerizable with the corresponding olefinically unsaturated compound $CH_2=C(R)-NH-CO-NH-R^1$. The K value of the polymer means the technical parameter which is conventionally used to characterize the degree of polymerization of a polymer. The K values of the polymers of the invention were measured by the method of H. Fikentscher, Cellulosechemie 13 (1932), 58-64 and 71-74, in 5 percent strength aqueous sodium chloride solution at 25° C.; $K = k \cdot 10^3$.

The substituent $R^1$ in the side chain of the polymers is either 1,6,6-trimethylnorpinanyl-2-methyl, i.e. 1,6,6-trimethyl-bicyclo-[3,1,1]-heptanyl-2-methyl, or 3-pinanylmethyl, i.e, 2,6,6-trimethyl-bicyclo-[3,1,1]-heptane-3-methyl. These radicals may each be in the optically active l (−) or d (+) form. Optical activity means the physical phenomenon whereby the solution of an optically active substance rotates the plane of linearly polarized light through a certain angle to the right (+) or to the left (−). Solutions of the polymers claimed may be dextro-rotatory, levo-rotatory or non-rotatory (d, l), depending on whether the substituent $R^1$ is in the levo-rotatory form, the dextro-rotatory form or the racemate form (d, l). These effects are disclosed in the relevant literatur and do not require further description here.

The new polymers are manufactured by polymerizing the olefinically unsaturated compounds, containing 1,6,6-trimethylnorpinanyl-2-methyl or 3-pinanylmethyl groups, of the general formula

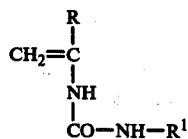

where R is H or $CH_3$ and $R^1$ is

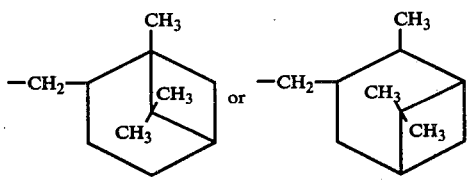

or copolymerizing the above compounds with copolymerizable compounds in the presence of initiators which form free radicals. The olefinically unsaturated monomers containing methylpinane groups are compounds I–IV.

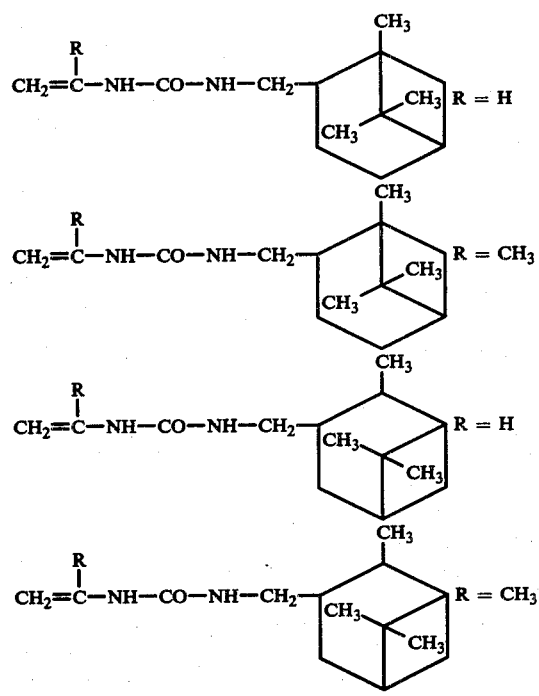

Such olefinically unsaturated monomers containing methylpinane groups are manufactured by, for example, reacting the corresponding aminomethylpinanes with vinyl isocyanate or isopropenyl isocyanate.

The monomers of the formulae I to IV can each be homopolymerized. Of course it is also possible to copolymerize mixtures of different compounds from this group. Furthermore, the compounds may be copolymerized with other olefinically unsaturated monomers.

Examples of suitable olefinically unsaturated monomers which may be copolymerized with the optically active urea compounds are olefins, e.g. ethylene, propylene, butadiene, isoprene, styrene and substituted styrenes, e.g. α-methylstyrene, p-chlorostyrene and p-methylstyrene, acrylic acid esters and methacrylic acid esters, especially with alcohols of 1 to 18 carbon atoms, preferably of 1 to 8 carbon atoms, e.g. methyl, ethyl, butyl or ethylcyclohexyl acrylate or methacrylate; monoesters of ethylene glycol, 1,2-propylene glycol, 1,3-butylene glycol and 1,4-butylene glycol, acrylamide, methacrylamide and substituted amides, e.g. N-methylolacrylamide and their ethers, e.g. N-methylolacrylamide butyl ether and N-methylolmethacrylamide methyl ether, acrylonitrile and methacrylonitrile, vinyl esters, e.g. vinyl acetate and vinyl propionate, vinyl ethers, e.g. methyl vinyl ether, ethyl vinyl ether and alkyl vinyl ethers were alkyl is of 3 to 6 carbon atoms, fumaric acid, maleic acid and itaconic acid, esters of these acids, and maleic anhydride. It is also possible simultaneously to copolymerize two or more of the above compounds with the above optically active urea compounds. Difunctional crosslinking agents, e.g. divinylbenzene, may also be used, in amounts of from 0 to 3 percent by weight.

For the manufacture of copolymers, the proportion of the olefinically unsaturated monomers according to the invention, of the formula I to IV, in the monomer mixture can vary within wide limits, and can be, for example, from 1 to 99, especially from 5 to 80, and preferably from 8 to 60, percent by weight, based on the total weight of the monomers.

Conventional initiators which form free radicals are used to initiate the polymerization. Examples of suitable initiators are hydrogen peroxide, organic hydroperoxides and peroxides, e.g. caproyl peroxide, lauroyl peroxide, tert.-butyl perbenzoate, dicumyl peroxide, p-menthane hydroperoxide, cumene hydroperoxide and succinic acid peroxide, and aliphatic azo compounds which decompose into free radicals under polymerization conditions, e.g. 2,2'-azo-bis-2,4-dimethylvaleronitrile, 2,2'-azo-bis-isobutyronitrile and similar azonitriles, listed, for example, in J. Hine "Reaktivitat und Mechanismus in der organischen Chemie", published by Georg Thieme, Stuttgart (1960), page 412, as well as conventional redox catalyst systems, e.g. the systems comprising potassium persulfate or ammonium persulfate with ascorbic acid, sodium bisulfite or iron-II salts.

The transition metal chelates known to form free radicals, e.g. chelates of manganese-(III), cobalt-(III), copper-(II) and cerium-(IV), are also suitable. In general, 1,3-dicarbonyl compounds are used as chelating agents. Examples of chelates are manganese-(III) acetylacetonate and cobalt-(III) acetoacetate. The polymerization can also be initiated by radiation, in the presence or absence of sensitizers, e.g. benzoin derivatives.

The initiators are in general used in an amount of from 0.05 to 5 percent by weight, preferably from 0.1 to 1.0 percent by weight, based on the amount of monomer. The optimum amount, and the initiator of optimum activity, can readily be established experimentally.

The polymerization may be carried out as a mass polymerization. Advantageously, however, it is carried out in the presence of solvents or diluents. Examples of these are ketones, e.g. methyl ethyl ketone or methyl propyl ketone, ethers, e.g. diethyl ether, tetrahydrofuran or dioxane, and aliphatic, cycloaliphatic and aromatic hydrocarbons, e.g. hexane, heptane, cyclohexane, benzene or toluene; dimethylformamide is also very suitable.

The suspension or solution polymerization processes conventionally used for many other monomers or monomer mixtures may also be used for the new process. Nor does the new process differ from conventional processes in respect to the assistants which may be used, e.g. dispersants, protective colloids and the like.

The polymerization can be carried out over a wide temperature range, e.g. at from 0 to 150° C., preferably from 50 to 120° C., with reaction times of from 1 to 20 hours, preferably from 2 to 10 hours. In general, the polymerization is carried out under atmospheric pressure, but superatmospheric pressure may also be used. The use of the latter is particularly indicated in the case of copolymerizations with low-boiling comonomers, in order to achieve a sufficient concentration of the comonomer in the reaction mixture.

The copolymerization of the optically active urea compounds with ethylene or butadiene is advantageously carried out in aliphatics or aromatics, by introducing the copolymerizable monomers into the solvent, which contains an initiator, and polymerizing under superatmospheric pressure, in the case of ethylene as the comonomer at pressures of up to about 2,000 atmospheres.

The copolymerization with acrylic acid esters is advantageously carried out in aromatic or aliphatic hydrocarbons, under the conventional conditions for the polymerization of acrylic acic esters.

The polymers of the invention, which have K values of from 20 to 140, preferably from 50 to 90, can easily be methylolated because they contain urea groups. They are used, for example, for the manufacture of moldings, impact-resistant compositions, coatings and adhesives, and may or may not be employed as mixtures with other plastics, e.g. with polyethylene, polypropylene or vinyl acetate/ethylene copolymers. Because of their surface-active properties, the polymers may inter alia be used for finishing paper and textiles.

Since the polymers according to the invention contain optically active groups, they may also be used as optical modifiers for films. A further preferred use of the polymers is as special antistatic agents for plastics.

Copolymers of the olefinically unsaturated optically active amides with acrylic acid esters are also of particular industrial interest. These products are soluble, e.g. in dimethylformamide or N-methylpyrrolidone, have a high molecular weight, are miscible with pigments and can be crosslinked with conventional crosslinking agents at relatively low temperatures. Such polymers are exceptionally suitable for use as antistatic agents.

In the Examples, parts and percentages are by weight. Where no other solvent is mentioned, the K values were determined on 1 percent strength solutions in dimethylformamide, using the method of H. Fikentscher, Cellulosechemie 13 (1932), 58.

EXAMPLE 1

Ethyl acrylate and compound I (a derivative of $(-)$-3-aminomethylpinane, $[\alpha]_D^{20} = -39.96$) are mixed in various ratios, 0.1 percent by weight of azo-bis-isobutyronitrile is added in each case, and the mixtures are heated for 2 hours at 70° C.

The copolymers are precipitated with methanol, washed with methanol and dried in a reduced pressure oven for 10 hours at 60° C. and 12 mm Hg. The results obtained are listed in the Table which follows.

| No. | Ethyl acrylate parts | Optically active urea compound I parts | Conversion % | K value % | Proportion of compound I in the copolymer in per cent by weight |
|---|---|---|---|---|---|
| a | 9.9 | 0.1 | 100 | 94.5 | 0.9 |
| b | 9.5 | 0.5 | 100 | 95 | 4.9 |
| c | 9.0 | 1.0 | 98 | 96.5 | 9.9 |
| d | 8.5 | 1.5 | 99 | 97 | 14.9 |
| e | 8.0 | 2.0 | 96 | 99 | 19.7 |
| f | 7.0 | 3.0 | 100 | 82 | 29.8 |
| g | 6.0 | 4.0 | 105 | 84 | 39.9 |
| h | 5.0 | 5.0 | 98 | 80 | 49.8 |
| i | 4.0 | 6.0 | 100 | 79 | 60.0 |
| j | 2.5 | 7.5 | 98 | 74 | 74.8 |
| k | 1.0 | 9.0 | 95 | 76 | 90 |

EXAMPLE 2

A solution of 50 parts of toluene, 50 parts of a copolymer of ethyl acrylate and compound III (a derivative of $(+)$-3-aminomethylpinane, $D^{20} = +36.9$), manufactured as described in Example 1c) is prepared, and applied to a substrate.

The finish produced is clear and is insoluble in acetone or toluene.

EXAMPLE 3

6 parts of styrene and 6 parts of compound IV (a derivative of $(+)$-3-aminomethylpinane, $[\alpha]_D^{20} = +39.5$) are polymerized in the presence of 0.1 part of azo-bis-isobutyronitrile for 8 hours at 70° C. The copolymer has a K value of 66 and contains 50 percent by weight of copolymerized pinane derivative. The conversion is 94%.

EXAMPLE 4

Butadiene is forced in over a solution of 150 parts of toluene, 10 parts of pinane derivative from Example 1 and 1 part of azo-bis-isobutyronitrile until the butadiene pressure in the gas space is 6 atmospheres gauge, whilst stirring the mixture for 8 hours at 90° C. After this reaction time the copolymer has a solids content of 27 percent by weight and a K value of 76 and contains 15.0 percent by weight of pinane derivative.

EXAMPLE 5

The procedure described in Example 4 is followed, but the butadiene is replaced by ethylene; with a reaction time of 8 hours, a reaction temperature of 90° C. and an ethylene pressure, in the gas space, of 235 atmospheres gauge, a solution having a solids content of 20.8 percent by weight is obtained. The K value of the copolymer, which contains about 11.5 percent by weight of pinane derivative, is 44 (measured on a 1% strength solution in decahydronaphthalene).

EXAMPLE 6

A solution of 100 parts of toluene, 10 parts of compound III ($[\alpha]_D^{20} = +39.5$), 270 parts of styrene and 3 parts of azo-bis-isobutyronitrile is heated for two hours at 90° C., whilst stirring. 280 parts of a copolymer having a K value of 49 (measured on an 0.5% strength solution in toluene) and containing 3.5 percent by weight of pinane derivative are obtained.

EXAMPLE 7

6 parts of pinane derivative from Example 1 are polymerized in the presence of 0.01 part of azo-bis-isobutyronitrile for 2 hours at 70° C. 5.5 parts of a homopolymer having a K value of 69 are obtained.

EXAMPLE 8

The procedure described in Example 7 is followed, but the pinane derivative from Example 2 is used as the monomer; 5.5 parts of a homopolymer having a K value of 69 are obtained.

We claim:

1. A polymer, having a K value of from 20 to 140, which comprises structural units of the general formula

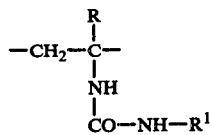
where R is H or CH₃ and R¹ is
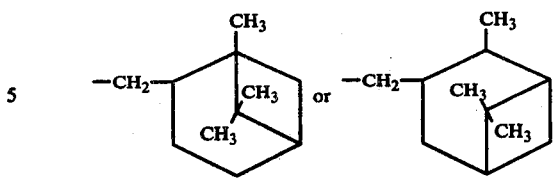
* * * * *